Dec. 8, 1964  H. MULCH  3,159,933
SLIDE PROJECTOR
Filed May 15, 1961  2 Sheets-Sheet 1
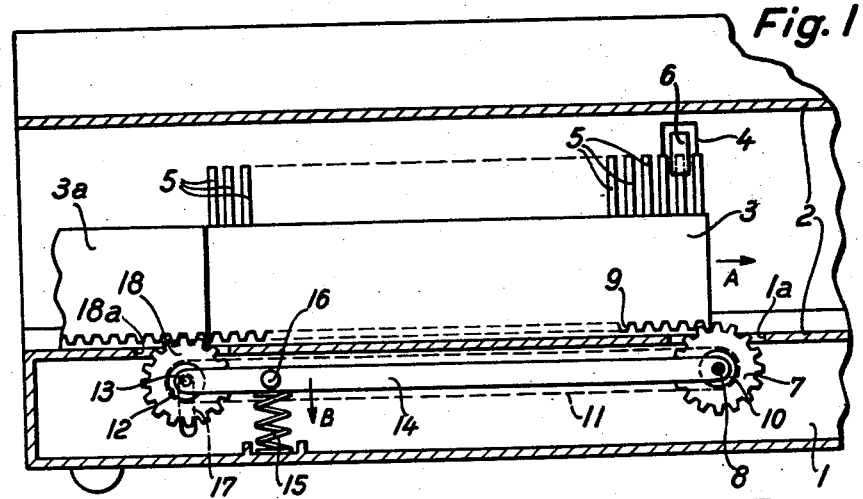
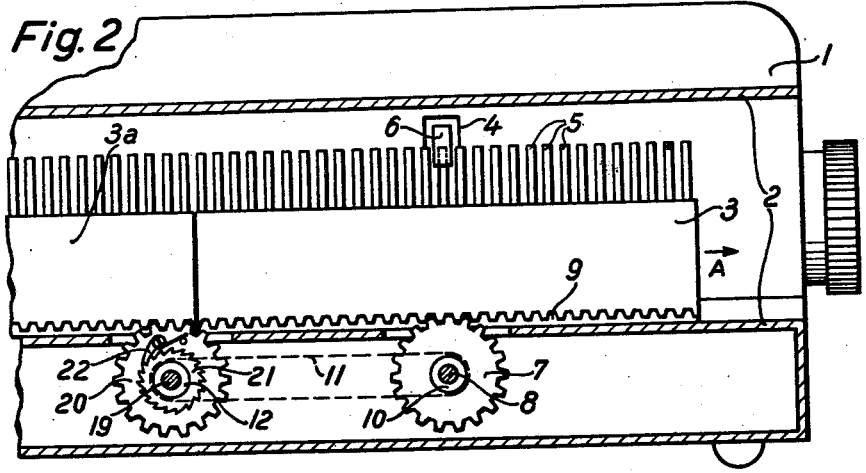
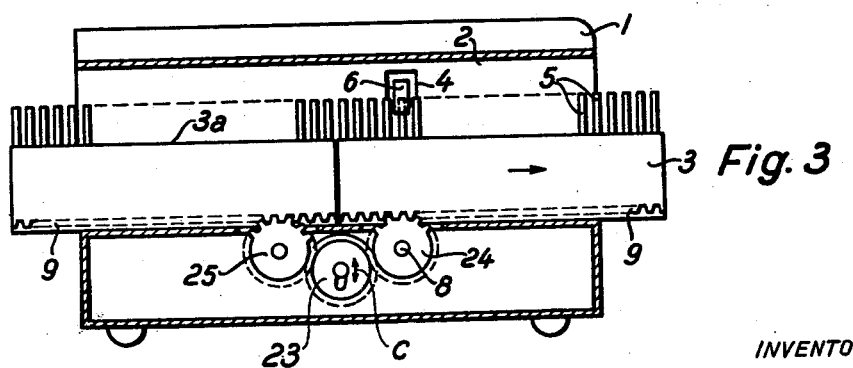
INVENTOR
HANS MULCH
BY Toulmin & Toulmin
Attorneys Dec. 8, 1964  H. MULCH  3,159,933
SLIDE PROJECTOR
Filed May 15, 1961  2 Sheets-Sheet 2
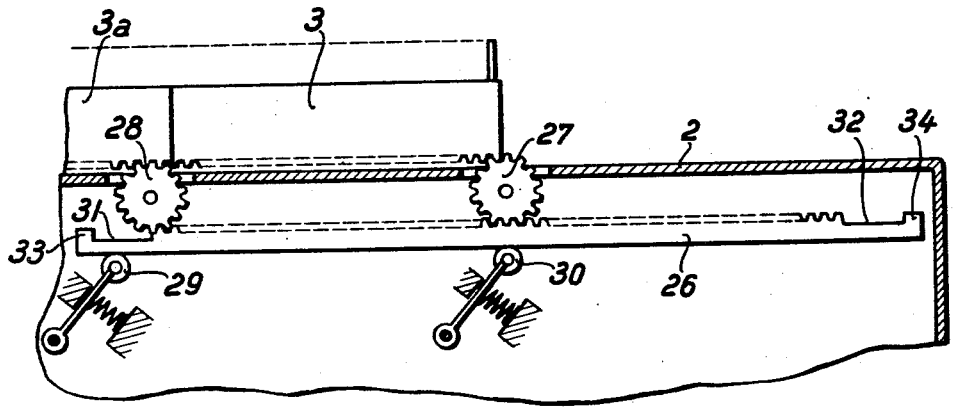
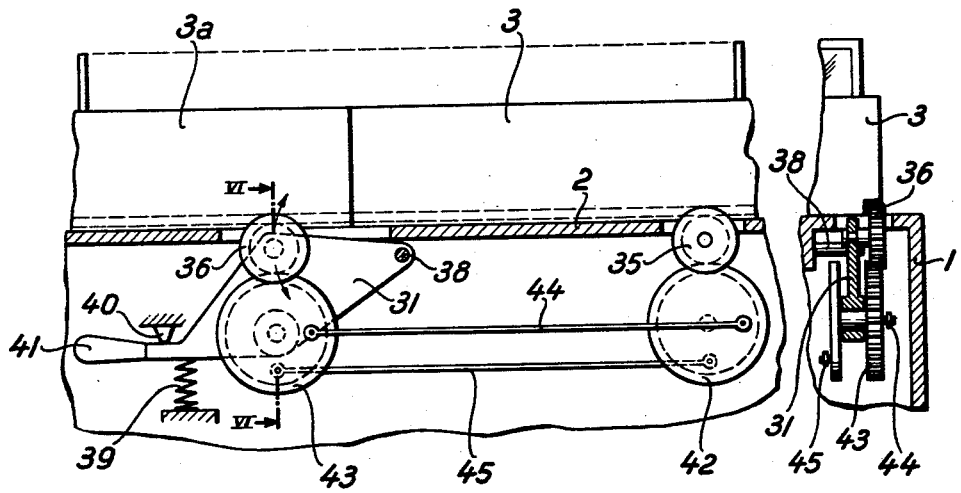
INVENTOR
HANS MULCH

United States Patent Office 3,159,933
Patented Dec. 8, 1964

3,159,933
SLIDE PROJECTOR
Hans Mulch, Wetzlar (Lahn), Germany, assignor to Ernst Leitz Gesellschaft mit beschränkter Haftung, Wetzlar (Lahn), Germany
Filed May 15, 1961, Ser. No. 110,217
Claims priority, application Germany, May 18, 1960, L 36,180
3 Claims. (Cl. 40—79)

The present invention relates to improvements in slide projectors, more particularly, to an arrangement for coupling in series two slide magazines which are inserted in the guideway of a slide projector.

It has been desired to devise an arrangement for feeding two magazines in series into a slide projector whereby there will not be any interruption between the projection of the last slide in the first magazine and the first slide in the second magazine. In most slide projectors the magazines are within the interior of the projector and hence it cannot be readily ascertained when the last slide in the first magazine is being projected. The only indication that one has that the last slide in the magazine has been projected is by the brightening of the screen following the operation of the slide-changing mechanism but wherein no slide is introduced.

It has been previously proposed to overcome this disadvantage by coupling the magazines prior to their introduction into the guideway of the projector. Such magazines were provided with clamps, hooks, latches or other coupling arrangements.

It is therefore the principal object of this invention to provide a novel and improved slide projector.

It is another object of this invention to provide a novel and improved arrangement for connecting in series two slide magazines which are introduced into the guideway of a slide projector.

It is a further object of this invention to provide a slide projector which can continuously show slides carried in two magazines without any interruption when the last slide in the first magazine has been reached.

It is an additional object of this invention to provide an arrangement for connecting two magazines in series without providing each magazine with special coupling structure.

In the present invention the slide magazine in the guideway is intermittently advanced in the usual manner by means of a rack-and-pinion drive wherein an advancing pinion engages a rack mounted on the bottom surface of the slide magazine. A second pinion which is identical to the first pinion is positioned forwardly of said first pinion so as to also project into the guideway and to engage the rack on the slide magazine. Both of the gears are operatively connected so that a magazine engaged with the second gear is advanced in the same manner as and simultaneously with a magazine engaged by the first gear.

The coupling in series of two magazines is achieved when the first magazine is engaged by the first gear and the second magazine is engaged by the second gear. This basic arrangement, however, does not of itself permit the coupling of the magazines in such a manner that the ends of the magazines abut each other. In order to couple the magazines in abutting engagement so as to avoid an undesirable pause in the projection of the slides, structure is provided whereby the second magazine can be inserted in the guideway a sufficient distance to abut the first magazine which is already in the operating position.

In the present invention the second or synchronous pinion is retracted from the guideway during the introduction of the second magazine. This invention also provides for a clutch mounted on the second pinion whereby the second magazine may be slid over the second pinion without affecting the driving relationship between the first and second pinions.

One structure disclosed in the present invention comprises a pivotally mounted lever with the second gear being mounted on one end of the lever. Means are provided on the lever to pivot the lever around its axis, which corresponds to the axis of the first pinion whereby the second pinion is retracted from the guideway and the second magazine may be introduced in abutting relationship to the first magazine without contacting the second gear.

A chain drive, a toothed rack or an intermediate gear train can be used for drive-connecting the second gear with the first gear. The distance between the axes of the two gears depends essentially on the gearing of the rack gear on the magazine but this distance should be as great as possible. This distance, however, should not exceed the length of the rack gear on the magazines which are being used. The distance through which both of the magazines are coupled is determined by the distance between the axes of the two gears.

Other objects and advantages of this invention will be apparent upon reference to the accompanying description when taken in conjunction with the following drawings, wherein FIGURE 1 is a sectional view of a slide projector incorporating the present invention and shows a side elevational view of the slide magazine, the advancing and synchronous gears and a chain drive interconnecting these gears.

FIGURE 2 is a view similar to FIGURE 1 but shows a modification of this invention wherein the second gear is provided with a unidirectional clutch.

FIGURE 3 is a view similar to that of FIGURE 1 but shows the use of an intermediate gear for drivingly connecting the advancing and synchronous pinions.

FIGURE 4 is a view similar to that of FIGURE 1 but shows a further modification wherein the advancing and synchronous pinions are drivingly interconnected by a rack gear.

FIGURE 5 is a view also similar to that of FIGURE 1 and shows a modification wherein the advancing and synchronous pinions are interconnected by two connecting rods.

FIGURE 6 is a sectional view taken along the line VI—VI of FIGURE 5.

The objects of the present invention can be achieved by a specific embodiment and several modifications of the present invention which are next described with reference to the accompanying drawings wherein like reference symbols indicate the same parts throughout the various views.

In FIGURE 1 there is indicated a slide projector casing 1 which has a guideway 2 for receiving slide magazines 3 and 3a. The slide magazines are advanced in the direction indicated by the arrow A.

In the side wall of the guideway there is a slot 4 into which the slides 5 are introduced by a slide-changing mechanism 6 to be inserted into the slide-projecting position. The slide-changing mechanism is conventional and the slides are of the usual type which are mounted in compartments formed in slide magazine 3. There is mounted in the casing beneath the bottom surface of the guideway 2 a driving or advancing pinion 7 which projects through a slot 7a into the guideway. The pinion or gear 7 is mounted on a shaft 8 and is intermittently rotatable by means of a driving mechanism which is coupled with the slide-changing mechanism but is not shown in the drawings. The movement of the driving pinion to intermediately advance the magazine is known in the art.

The slide magazine 3 has a rack gear 9 on the bottom surface thereof which rack gear has gear teeth corresponding to the drive pinion 7. A sprocket gear 10 is mounted on the shaft 8 coaxially with the pinion 7 and is connected by means of a driving chain 11 to a second sprocket wheel 12 mounted on a shaft 13. The shaft 13 is mounted onto the free end of a lever 14 which is pivotally mounted on the shaft 8. A spring 15 urges the lever 14 into its uppermost position, as illustrated in FIGURE 1. A handle 16 extends laterally from the lever 14 to permit a manual depression of the lever against the force of the spring 15. The range of pivoting movement of the lever 14 is determined by stops which coact with an arcuate slot 17 formed in the wall of the casing.

A second or synchronous pinion 18 is mounted on the shaft 13 coaxial with the sprocket wheel 12. The synchronous gear 18 is identical to the driving pinion 7 and projects into a guideway through a slot 18a, until the lever is in its operating uppermost position, as shown in FIGURE 1. Pivoting of the lever 14 in the direction of the arrow B will retract the synchronous pinion 18 from the guideway and disengage this pinion from the rack gear on the bottom of the slide magazine.

The distance between the axes of the gears 7 and 18 corresponds to the length of the rack 9 on the slide magazine.

The coupling of the slide magazines 3 and 3a is achieved by the pinions 7 and 18 which are operatively connected with each other by the chain drive 11. When the second magazine 3a is to be introduced into the guideway 2 the lever 14 is pivoted downwardly in the direction of the arrow B so as to retract the pinion 18 from the guideway. The slide magazine 3a can then be introduced into the guideway so as to abut against the end of the slide magazine 3. This abutting relationship between the magazines will provide for an uninterrupted projection of the slides in the two magazines since there will be no pause after the projection of the last slide in the magazine 3.

Reference to FIGURE 1 illustrates the magazine 3 in a position where it has just been engaged by the driving pinion 7 and will be subsequently advanced by this pinion. The second magazine 3a has already been introduced and the lever 14 has been pivoted to its normal operating position under the action of the spring 15 to the point where the synchronous pinion 18 now meshes with the rack on the magazine 3a. It is noted that prior to the engagement of the slide magazine 3 with the driving pinion 7 the synchronous pinion 18 advanced the magazine 3 through the guideway. With the magazines 3 and 3a in the position as illustrated in FIGURE 1, it is apparent that each movement of the driving pinion 7 will produce a corresponding movement in the synchronous gear 18 and correspondingly both magazines 3 and 3a will move simultaneously.

Proceeding next to FIGURE 2 there is illustrated a modification of the present invention. In this modification the sprocket gear 12 is mounted on a shaft 19 which is supported in the casing 1 of the projector. A roller clutch comprising a ratchet wheel 21 and a pawl 22 is provided between the sprocket wheel 12 and the synchronous pinion 20 which is identical to the driving pinion 7.

When a magazine is introduced into the guideway in the direction of the arrow A the rack gear 9 will engage the synchronous pinion 20 to cause a rotation thereof. This rotation of the pinion 20, however, will not be transmitted to the driving pinion 7. However, when the driving pinion 7 is intermittently rotated by the slide-changing mechanism the synchronous pinion 20 will rotate simultaneously therewith because of the driving chain 11 and the unidirectional clutch arrangement between the sprocket gear 12 and the synchronous gear 20. This simultaneous movement of the gears 7 and 20 will produce a coupling of the magazines 3 and 3a in the manner as previously described. This modification also permits the introduction of the second magazine 3a in such a manner that this magazine will abut the end of the first magazine 3.

In FIGURE 3 there is shown a further modification of this invention wherein an intermediate gear or a gear train can be utilized as an operating connection between the two pinions. In this modification the driving pinion is indicated at 24 and the synchronous pinion at 25. Both of these pinions are mounted in the casing 1 and project into the guideway of the magazine. An intermediate gear 23 is positioned so as to mesh with both of the gears 24 and 25. This intermediate gear, however, is mounted so as to disengage the synchronous gear 25 from the driving gear 24. In the modification the shaft of the intermediate gear 23 is mounted in a slot so as to permit movement of the intermediate gear 23 in the direction of the arrow C. Accordingly, the downward movement of the intermediate gear 23 will function to disengage this gear from both of the gears 24 and 25. However, a suitable structure may be employed wherein the intermediate gear 23 is disengaged from only one of these pinions.

It is pointed out that the pinion 25 may be provided with a unidirectional clutch similar to that illustrated and described in FIGURE 2.

Thus it can be seen that the present invention provides a simple yet effective arrangement for coupling in series two slide magazines which are introduced into the guideway of a slide projector. This arrangement does not require any coupling structure to be mounted on the slide magazines and does not require any modification of these magazines.

Proceeding next to FIGURE 4 there is illustrated a modification wherein a rack gear is used to operatively connect the advancing and synchronous pinions. There is an elongated member 26 which has a rack gear on the upper surface thereof. The rack gear is in mesh with an advancing gear 27 and a synchronous gear 28. The rack is positioned below the gears 27 and 28 and opposite to the guideway 2. Spring biased rollers 29 and 30 engage the lower surface of the rack gear to maintain the rack gear in engagement with the gears 27 and 28. The length of the rack gear corresponds to the combined lengths of the magazines 3 and 3a.

There are recesses 31 and 32 at both ends of the rack gear 26 on the upper surface thereof. Abutments or stop members 33 and 34 are provided at the ends of the rack gear to prevent the rack gear from slipping out of its meshing engagement with the gears 27 and 28 when introducing the magazine 3a into the guideway.

In the modification of FIGURES 5 and 6 an advancing gear 35 is mounted on the casing to project into the guideway as previously described. A synchronous gear 36 is mounted on a plate 37 which is pivotally mounted at one end thereof indicated at 38. The plate 37 is held in its uppermost position, as illustrated in FIGURE 5, by a spring 39 which biases the plate against a stop 40. A handle 41 is provided on one end of the plate to move the plate against the force of the spring 39 so as to retract the synchronous gear 36 from the guideway.

Another gear 42 is mounted on the casing so as to mesh with the advancing gear 35. A further gear 43 is mounted on the plate 37 so as to mesh with the synchronous gear 36. The gears 42 and 43 are interconnected by connecting rods 44 and 45 which are staggeredly arranged and are on opposite faces of the gears 42 and 43. The staggered arrangement avoids the possibility of a dead-center positioning of the interconnected gears.

In this modification, pivoting of the plate 37 downwardly will retract the gear 36 from the guideway to permit the second magazine to be introduced into the guideway to abut the end of the first magazine.

It will be understood that this invention is susceptible to modification in order to adapt it to different usages and conditions and, accordingly, it is desired to comprehend such modifications within this invention as may fall within the scope of the appended claims.

What is claimed as this invention is:

1. In a slide projector having a casing with a guideway for receiving slide magazines of the type having a rack gear on a surface thereof, the combination comprising: a first gear mounted on said casing and projecting into said guideway for drivingly engaging a rack gear of a magazine when in said guideway, a second gear identical to said first gear mounted on said casing forwardly of said first gear and projecting into said guideway for engaging a rack gear of a magazine when in said guideway, means for operatively connecting said second gear to said first gear so that a magazine engaged by said second gear is advanced in a like manner as a magazine engaged by said first gear, and means for selectively engaging and disengaging said first gear with a rack gear of a magazine when in said guideway.

2. In a slide projector having a casing with a guideway for receiving slide magazines of the type having a rack gear on a surface thereof, the combination comprising: a first gear mounted on said casing and projecting into said guideway for drivingly engaging a rack gear of a magazine when in said guideway, a lever having one end thereof pivotally mounted on the axis of said first gear, a second gear mounted on the other end of said lever and projecting into said guideway for engaging a rack gear of a magazine in said guideway and when said lever is in its uppermost position, means for operatively connecting said second gear to said first gear so that a magazine engaged by said second gear is advanced in a like manner as a magazine engaged by said first gear, spring means biasing said lever into said uppermost position, and means on said lever for pivoting said lever against the force of said spring means to retract said second gear from said guideway whereby said second gear is disengaged from a rack gear on a magazine on said guideway.

3. In a slide projector having a casing with a guideway for receiving slide magazines of the type having a rack gear on a surface thereof, the combination comprising: a first gear mounted on said casing and projecting into said guideway for drivingly engaging a rack gear of a magazine when in said guideway, a plate pivotally mounted on said casing beneath said guideway, a second gear mounted on said plate and projecting into said guideway to engage a rack gear of a magazine when in said guideway when said plate is in its uppermost position, a third gear mounted on said casing and meshing with said first gear, a fourth gear mounted on said plate and meshing with said second gear, a pair of connecting rods interconnecting said third and fourth gears so that a magazine engaged by said second gear is advanced in a like manner as a magazine engaged by said first gear, spring means urging said plate into its uppermost position, and a handle on said plate to pivot said plate against said spring means to retract said second gear from said guideway and to disengage the same from a rack gear on a magazine when on said guideway.

References Cited by the Examiner

UNITED STATES PATENTS

| | | | |
|---|---|---|---|
| 940,091 | 11/09 | Trewhella | 74—422 |
| 2,442,365 | 6/48 | Leming. | |
| 2,865,121 | 12/58 | Anderton. | |
| 2,878,604 | 3/59 | Mulch | 40—79 |
| 2,931,115 | 4/60 | Pester | 40—79 |
| 2,938,288 | 5/60 | Wallin | 40—79 |
| 2,984,151 | 5/61 | Halahan | 88—28 |
| 2,998,665 | 9/61 | Diemer et al. | 40—79 |

FOREIGN PATENTS 1,117,321 11/61 Germany.

JEROME SCHNALL, *Primary Examiner.*

E. V. BENHAM, *Examiner.*